United States Patent
Moyer

(10) Patent No.: US 11,947,455 B2
(45) Date of Patent: Apr. 2, 2024

(54) SUPPRESSING CACHE LINE MODIFICATION

(71) Applicant: Advanced Micro Devices, Inc., Santa Clara, CA (US)

(72) Inventor: Paul J. Moyer, Fort Collins, CO (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 18/135,555

(22) Filed: Apr. 17, 2023

(65) Prior Publication Data

US 2023/0325313 A1 Oct. 12, 2023

Related U.S. Application Data

(63) Continuation of application No. 17/489,702, filed on Sep. 29, 2021, now Pat. No. 11,630,772.

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | |
|---|---|---|
| 2002/0116584 A1* | 8/2002 | Wilkerson ............ G06F 12/126 712/E9.05 |
| 2009/0204765 A1 | 8/2009 | Wilkerson |
| 2009/0228744 A1 | 9/2009 | Deenadhayalan et al. |
| 2015/0347298 A1 | 12/2015 | Hagersten et al. |
| 2016/0170890 A1 | 6/2016 | Steiss |
| 2019/0065403 A1 | 2/2019 | Zaydman et al. |
| 2021/0200683 A1 | 7/2021 | Baviski et al. |

* cited by examiner

*Primary Examiner* — Jae U Yu
(74) *Attorney, Agent, or Firm* — Volpe Koenig

(57) ABSTRACT

Disclosed is a system and method for use in a cache for suppressing modification of cache line. The system and method includes a processor and a memory operating cooperatively with a cache controller. The memory includes a coherence directory stored within a cache created to track at least one cache line in the cache via the cache controller. The processor instructs a cache controller to store a first data in a cache line in the cache. The cache controller tags the cache line based on the first data. The processor instructs the cache controller to store a second data in the cache line in the cache causing eviction of the first data from the cache line. The processor compares based on the tagging the first data and the second data and suppresses modification of the cache line based on the comparing of the first data and the second data.

20 Claims, 5 Drawing Sheets

SUPPRESSING CACHE LINE MODIFICATION

CROSS REFERENCE TO RELATED APPLICATIONS

This application is a continuation of U.S. patent application Ser. No. 17/489,702, filed Sep. 29, 2021, which is incorporated by reference as if fully set forth.

BACKGROUND

Modern microprocessors implement a wide array of features for high throughput. Some such features include having highly parallel architectures and suppressing modification of lines if insertion data into a cache matches eviction data. Improvements to such features are constantly being made.

BRIEF DESCRIPTION OF THE DRAWINGS

A more detailed understanding can be had from the following description, given by way of example in conjunction with the accompanying drawings wherein.

DETAILED DESCRIPTION

Figure 1:
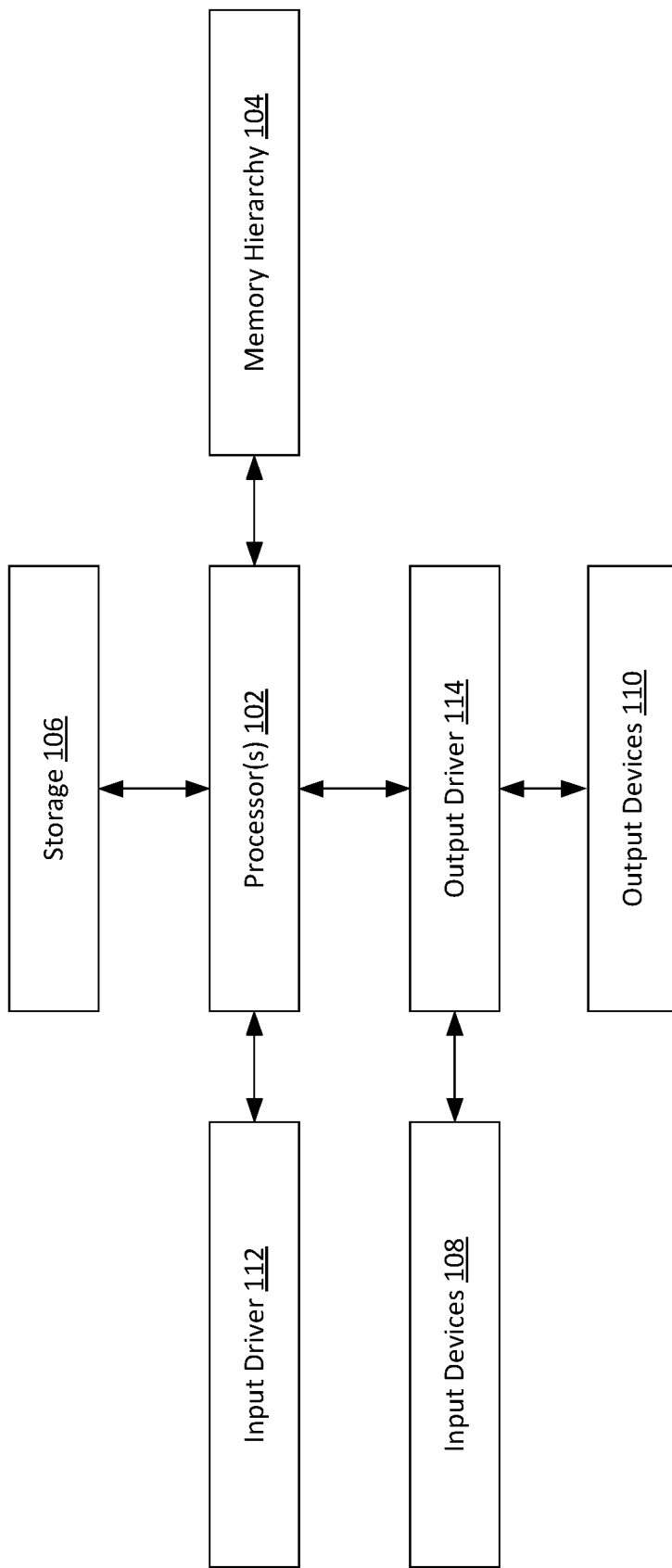
FIG. 1 is a block diagram of an example device in which one or more disclosed implementations can be implemented.

In computing, a cache is a hardware or software component that stores data allowing for future requests for that data to be served faster as compared to other memory locations communicatively located further from the processor. By way of example, the data stored in a cache might be the result of an earlier computation or a copy of data stored elsewhere. A cache hit occurs, responsive to a probe or request, when the requested data can be found in a cache, while a cache miss occurs when the requested data cannot be found in the cache. Cache hits are served by reading data from the cache, which is faster than recomputing a result or reading from a slower data store. As is understood, the more requests that can be served from the cache, the faster the system performs.

In order to gain the benefit of the use of the cache and the data stored therein, it is important to maintain an understanding of the accuracy of the data in the cache. While there are numerous utilized protocols for maintaining the data in the cache, one such protocol is the MESI protocol, which is a common invalidate-based cache coherence protocol. The MESI protocol is named based on the possible states for the data in the cache. In the MESI protocol, there are four states (coherence tracking states)—Modified (M), Exclusive (E), Shared (S), and Invalid (I).

Modified (M) represents that the cache line is present only in the current cache, and has been modified (M state) from the value in main memory. The cache is required to write the data back to main memory, before permitting any other read of the (no longer valid) main memory state. The write-back changes the line to the Shared state(S).

Exclusive (E) represents that the cache line is present only in the current cache, and matches main memory version. The cache line can be changed to the Shared state at any time, in response to a read request. Alternatively, the cache line can be changed to the Modified state when writing to the cache line.

Shared (S) represents that the cache line can be stored in other caches of the machine and matches the main memory version. The line can be discarded (changed to the Invalid state) at any time.

Invalid (I) represents that the cache line is invalid (unused).

As would be understood, the tracking of cache state requires memory and clock cycles. Computer resources are used when changing states and writing data from the cache line to or from other memory locations. While the use of the cache and cache states save computer time and processing, further minimizing changing states of the cache lines when unnecessary and the writing from the cache to or from memory can be beneficial. As such, minimizing the reporting of the modified states for a cache and minimizing the changing of states can provide a benefit when certain conditions exist.

Techniques for suppressing the reporting of the modified state for a cache in a cache in response to a value of data leaving a cache level of the cache matching the value of the data when the data first entered the cache level are described.

A method for use in a cache for suppressing modification of cache line is disclosed. The method includes storing a first data in a cache line in the cache, tagging the cache line based on the first data, and determining to store a second data in the cache line in the cache. The storing the second data in the cache line in the cache causes eviction of the first data from the cache line. The method includes comparing based on the tagging the first data and the second data. The method includes suppressing modification of the cache line based on the comparing of the first data and the second data cache line. The storing of the second data in the cache line in the cache causing eviction is based on a capacity eviction, a coherency probe, explicit flush instructions, or a microarchitectural event. The microarchitectural event can include power management clearing of the cache. The method can include migrating the cache line to a new cache level.

A system for suppressing modification of cache line is disclosed. The system includes a processor and a memory operating cooperatively with a cache controller. The memory includes a coherence directory stored within a cache created to track at least one cache line in the cache via the cache controller. The processor instructs a cache controller to store a first data in a cache line of the at least one cache line in the cache. The cache controller tags the at least one cache line in the cache based on the first data. The processor instructs the cache controller to store a second data in the cache line of the at least one cache line in the cache causing eviction of the first data from the cache line. The processor compares based on the tagging the first data and the second data and suppresses modification of the cache line of the at least one cache line in the cache based on the comparing of the first data and the second data. The storing of the second data in the cache line in the cache causing eviction is based on a capacity eviction, a coherency probe, explicit flush instructions, or a microarchitectural event. The microarchitectural event can include power management clearing of the cache. The method can include migrating the cache line to a new cache level.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 can also optionally include an input driver 112 and an output driver 114. It is understood that the device 100 can include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 can be located on the same die as one or more of the one or more processors 102, or can be located partially or completely separately from the one or more processors 102. The memory hierarchy 104 includes, for example, one or more caches, one or more volatile memories, one or more non-volatile memories, and/or other memories, and can include one or more random access memories ("RAM") of one or a variety of types.

In some examples, the elements of the memory hierarchy 104 are arranged in a hierarchy that includes the elements of the one or more processors 102. Examples of such an arrangement is provided in FIGS. 3 and 4.

The storage device 106 includes a fixed or removable storage, for example, a hard disk drive, a solid-state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 are optional components, and that the device 100 will operate in the same manner if the input driver 112 and the output driver 114 are not present.

Figure 2:
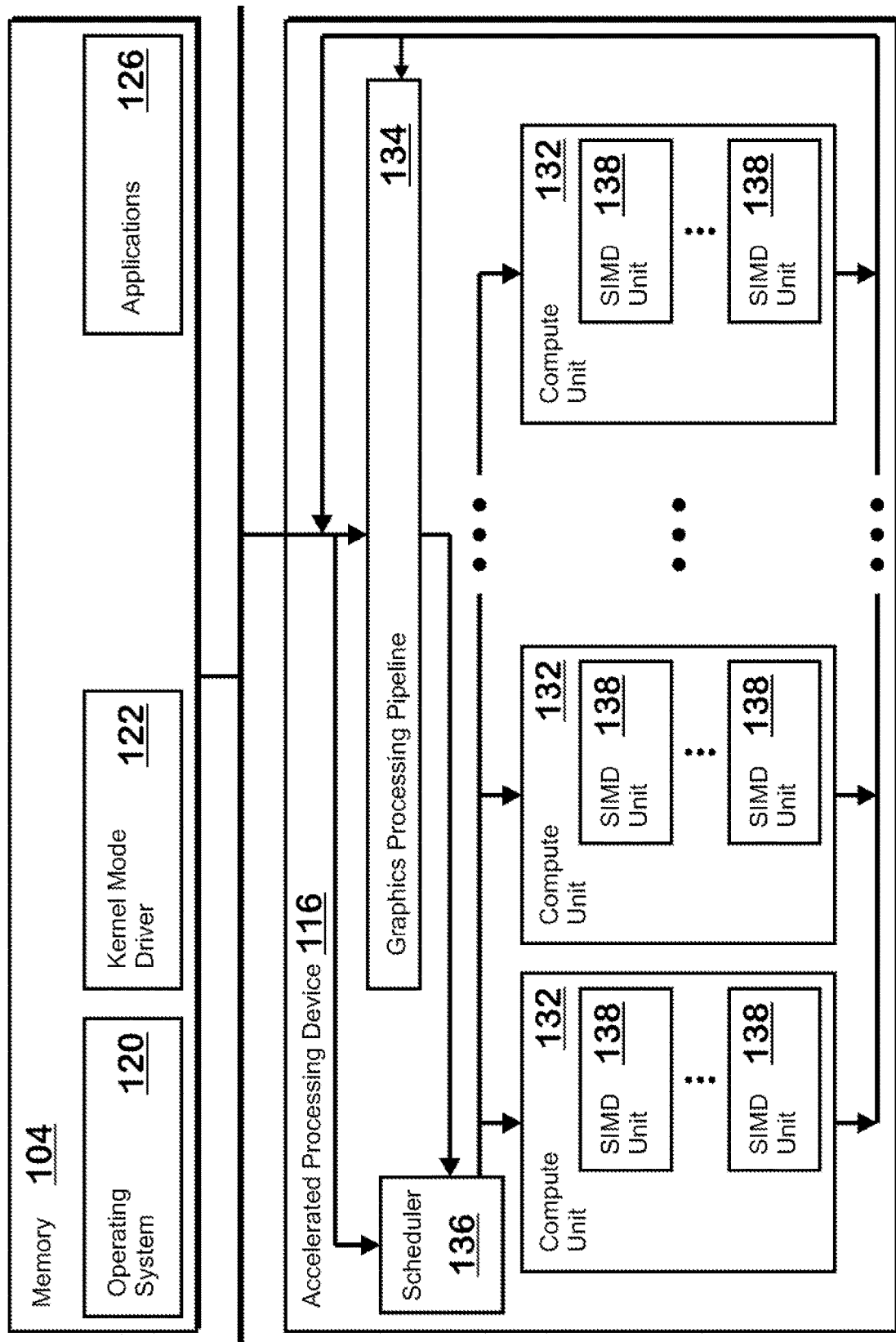
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which can be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

The instruction execution pipeline 200 executes some instructions speculatively. Speculative execution means that the instruction execution pipeline 200 performs at least some operations for execution of the instruction, but maintains the ability to reverse the effects of such execution in the event that the instruction was executed incorrectly.

As described, caches store cache data, and have cache tags to determine the address, and have other miscellaneous state, such as the coherence state, for example in the MESI cache coherence protocol. When a cache line is evicted, or probed, from the cache hierarchy, if it was modified, memory, such as DRAM or the like, is written. Cache lines transition to the modified state when a store instruction is executed to that cache line. In an implementation, the reporting of the modified state is suppressed, if the data leaving the cache level matches the value when it entered the cache level.

Figure 3:
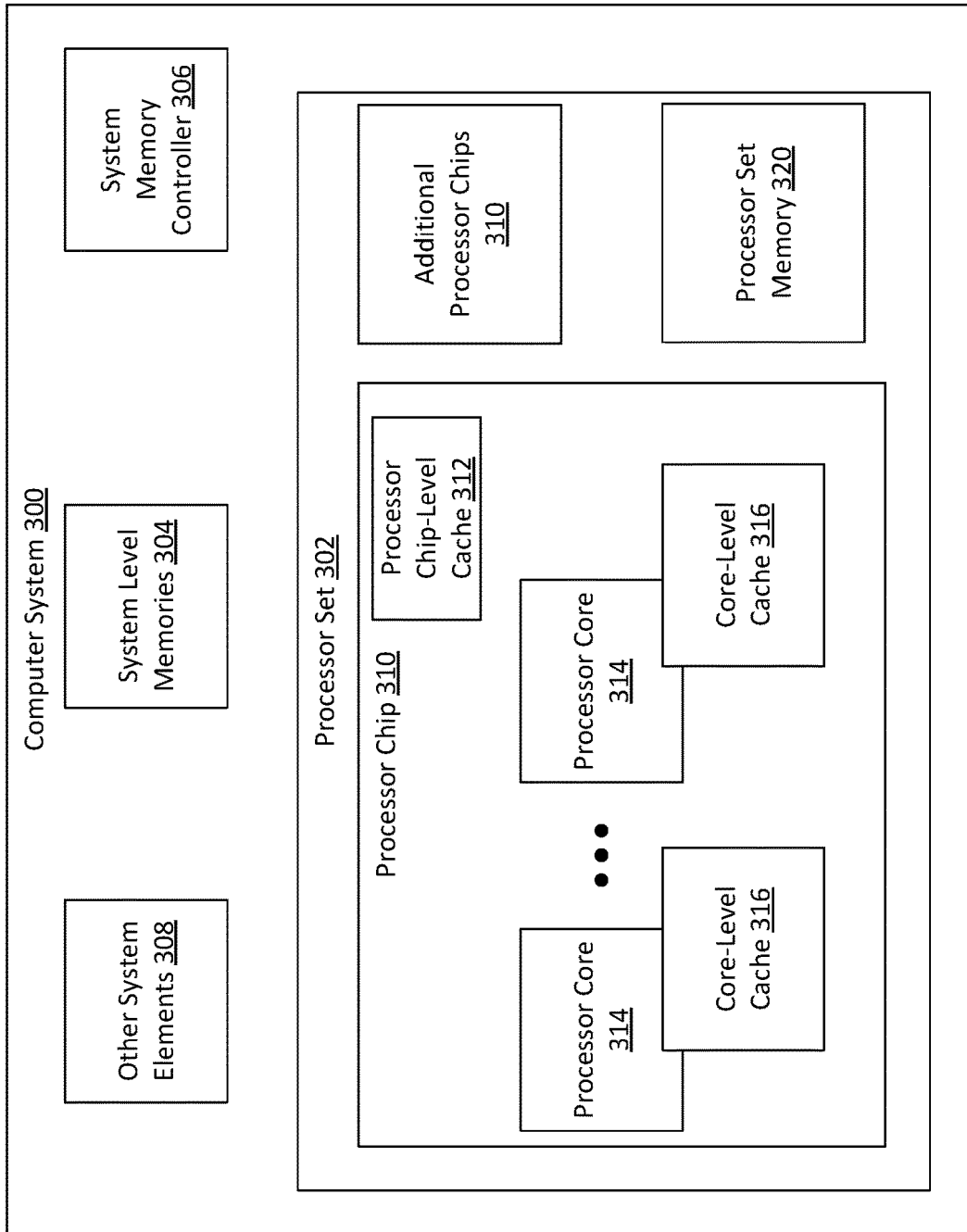
FIG. 3 is a block diagram of a computer system, according to an example.

FIG. 3 is a block diagram of a computer system 300, according to an example. In some examples, the computer system 300 is the computer system 100 of FIG. 1. The computer system 300 includes a processor set 302, one or more system-level memories 304, a system memory controller 306, and other system elements 308.

The processor set 302 includes one or more processor chips 310. Each processor chip 310 includes a processor chip-level cache 312 and one or more processor cores 314. Each processor core 314 has an associated core-level cache 316. Each of the processor cores 314 includes one or more execution pipelines such as the instruction execution pipeline 200 of FIG. 2.

The caches and memories illustrated in FIG. 3 operate in parallel and therefore use a coherence protocol to ensure data coherence. One example of such a protocol is the modified-exclusive-shared-invalid ("MESI") protocol. Each cache line includes an indication of one of these four states. The modified state indicates that the copy of the cache line stored in a particular cache is modified with respect to the copy stored in a backing memory, and thus that the cache line must be written to the backing memory when the cache line is evicted. The exclusive state indicates that the cache line is stored in a particular cache and not in any other cache at the same level of the hierarchy. A cache line that is marked as exclusive can be stored in a higher level of the hierarchy. For example, a cache line stored in a level 0 cache in an exclusive state can also be stored in the level 1 cache directly above the level 0 cache. The shared state indicates that the cache line is stored in multiple caches at the same level of the hierarchy. The invalid state indicates that the cache line is not valid within the particular cache where that cache line is marked invalid (although another cache can store a valid copy of that cache line).

Each processor core 314 has an associated core-level cache 316. When a processor core 314 executes a memory operation such as a load operation or a store operation, the processor core 314 determines whether the cache line that stores the data for the memory operation is located within the core-level cache 316 associated with the processor core 314. If such cache line is not located within the core-level cache 316, then the core-level cache 316 attempts to fetch that cache line into that core-level cache 316 from a higher-level cache such as the processor chip-level cache 312. The processor chip-level cache 312 serves both as a higher-level cache memory and as a controller that manages the coherence protocol for the processor chip-level cache 312 and all core-level caches 316 within the same processor chip 310. Thus, the processor chip-level cache 312 checks itself to determine whether the requested cache line is stored therein for the purpose of providing that cache line to the requesting processor core 314. The processor chip-level cache 312 provides the cache line to the requesting core 314 either from its own contents or once fetched from a memory that is higher up in the hierarchy.

The processor chip-level cache 312 manages the coherence protocol for the core-level caches 316. In general, the processor chip-level cache 312 manages the protocol states of the cache lines within the core-level caches 316 so that if any cache line is in an exclusive state in a particular core-level cache 316, no other core-level cache 316 has that cache line in any state except invalid. Multiple core-level caches 316 are permitted to have the cache line in a shared state.

The protocol works on a level-by-level basis. More specifically, at each level of the memory hierarchy, each element within that levels is permitted to have a cache line in any of the states of the protocol. In an example, at the level of the processor set 302, each chip 310 (thus, each processor chip-level cache 312) is permitted to have a cache line in one of the states, such as a shared state or an exclusive state. A controller for a particular level of the hierarchy manages the protocol at that level. Thus, the processor set memory 320 manages the states of the processor chip-level caches 312. The processor chip-level cache 312 for any particular processor chip 310 manages the states of the core-level caches 316, and a system memory controller 306 manages the states for the processor set 302 and other system elements 308 that can store a particular cache line.

When a processor core 314 executes a store instruction, the processor core 314 requests that the cache line that includes the data to be written to is placed into the associated core-level cache 316 in an exclusive state. Part of satisfying this request involves requesting that the all other caches (other than the caches "directly above" the core-level cache 316) invalidate their copy of that cache line.

Caches 316 store cache data, and have cache tags to determine the address, and have other miscellaneous state, such as the coherence state and including the MESI cache coherence protocol, for example. When a cache line is evicted, or probed, from the cache hierarchy, if it was modified, memory is written. Cache lines transition to the modified state when a store instruction is executed to that cache line, as described above.

In an implementation, the reporting of the modified state is suppressed, if the data leaving the cache level matches the value when it entered the cache level. In an implementation, the suppression occurs when the data is the specific value of all zeroes. When the cache line enters a cache level, such as a level 2 cache, for example, the record in the cache tags a new indication that the line came in with the data value of all zeroes along with some other complexities around coherence protocol including, for example, that the line was not already modified previously and therefore is written to memory regardless of what action happens in this cache level. The cache line can be updated numerous times in its lifetime in the level two cache. The cache line can also be transferred to a level one cache. A benefit occurs when a store writes zeroes on top of a cache line which is already zero. Additional scenarios include writing nonzero data, but then the last write to the line is zero.

In an implementation, the cache controller check at cache eviction, or probe, time the state bit identifies that the line came in as all-zeroes. The cache controller check examines the current data to see if the data is all-zeroes, and if those conditions match, there is a suppression of the reporting that the line was modified.

Similar to the above implementation, the 'all-zero' check may be generalized to being multiple known patterns, or indexed into a structure of runtime-detected patterns.

Figure 4:
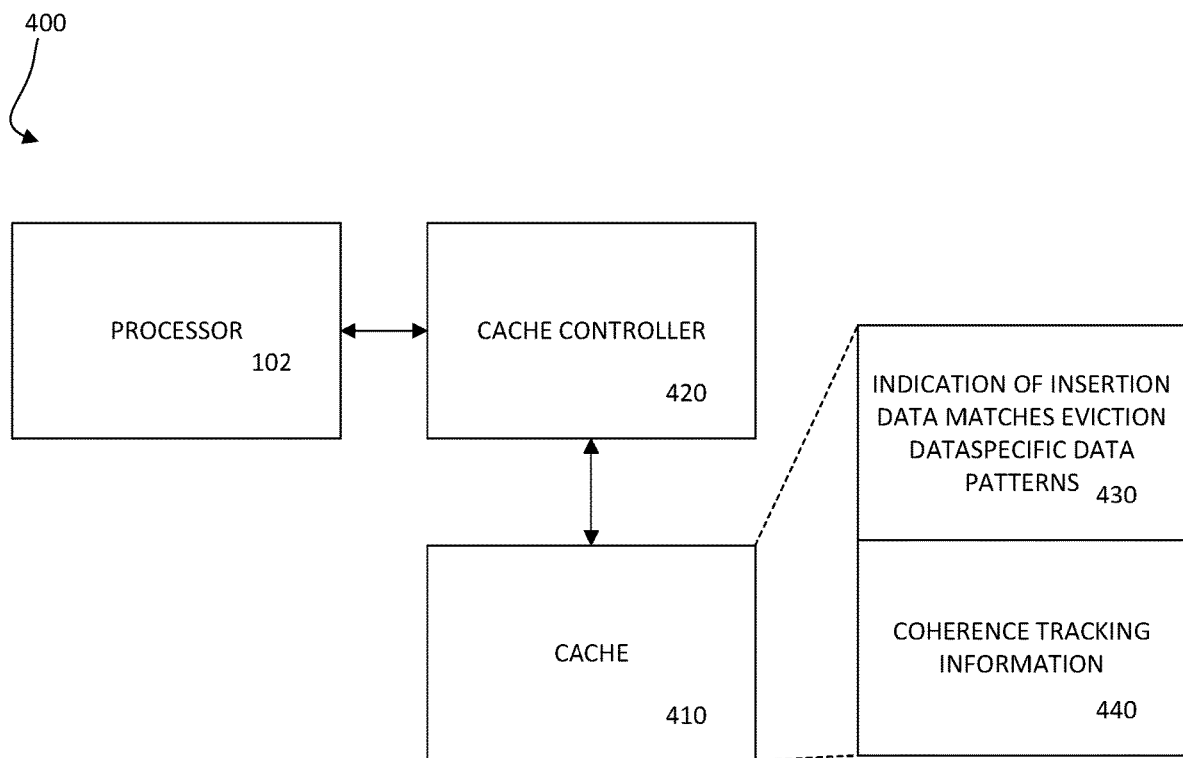
FIG. 4 illustrates a single level cache system configured to suppress modification of lines if insertion data into cache matches eviction data.

FIG. 4 illustrates a block diagram of a single level cache system 400 capable of suppressing modification of cache lines if insertion data into the cache line of cache 410 matches eviction data. As illustrated, cache system 400 includes a processor 102, a cache 410 and a cache controller 420 (e.g., the processor chip-level cache 312, the processor set memory 320, or the system memory controller 306) coupled to the cache 410. System 400 includes an indication of insertion data matching eviction data 430. In an implementation, indication 430 is coupled to one or both of cache 410 and controller 420. As set forth above, in an implementation, coherence tracking information 440 can be stored with the indication 430.

While not specifically illustrated, system 400 may include one or more levels of hierarchy. For example, one or more lowest levels of the hierarchy (first-order processor-memory hierarchy level), one or more next-level-up second-order processor-memory hierarchy levels, arranged in a hierarchy, one or more third-order processor-memory hierarchy levels, and, optionally, additional hierarchy levels, not shown. While system 400 illustrates only a single hierarchy, additional levels may be utilized.

FIG. 4 is a block diagram of a computer system capable of suppressing modification of cache lines in a cache. The suppression of the modification of cache lines occurs when insertion data into the cache line of cache 410 matches eviction data. FIG. 4 highlights those aspects of FIG. 3 necessary to understand the described capabilities. As would be understood the system 300 of FIG. 3 is an example of the system 400 of FIG. 4. Thus, while FIG. 3 shows specific types of hierarchy level elements such as cores, chips, and the like, the system of FIG. 4 does not necessarily include similar elements or groupings of elements in order to provide clear detail of the elements of FIG. 4 to aid in the understanding of the described capabilities. For example, the core-level caches 316 are examples of the cache 410. Processor 102 are examples of cores 314, additional processor chips 310, for example.

In some implementations, the indication of insertion data matching eviction data 430 is stored, even without actually storing the data, along with coherence tracking information 440 in the cache hierarchy. As illustrated in FIG. 4, the indication of insertion data matching eviction data 430 is stored with coherence tracking information 440 in cache 410. As would be understood, with reference to FIG. 3, the indication of insertion data matching eviction data 430 can be stored in other areas of the hierarchy of computer system 300. The value of the indication of insertion data matching eviction data 430 may be determined within cache controller 420, within memory unit 405 or otherwise within the computer system.

The reporting of the modified state is suppressed if the data leaving the cache 410 matches the value when the data entered the cache 410. As would be understood, while the MESI protocol would normally identify the data in such a condition to be in the modified state, which represents that the cache line is present only in the current cache 410, and has been modified (M state) from the value in main memory. The cache 410 is required to write the data back to main memory (not shown in FIG. 4), before permitting any other read of the (no longer valid) main memory state. The write-back changes the cache line to the Shared state(S). by suppressing the modified state when the data leaving the cache 410 matches the value when the data entered the cache 410, the data in the cache line of cache 410 remains the same and the steps necessary to deal with the modified state of the MESI protocol are not necessary. A benefit is achieved when stores write zeroes on top of a cache line which is already zero. Additional beneficial scenarios include writing nonzero data, but then the last write to the line is zero.

In an implementation, when the data is the specific value of all zeroes the suppression of the reporting of the modified state occurs. When the cache line enters a cache 410, such as a level 2 cache, for example, the cache tags record a new indication 430 that the line came in with the data value of all zeroes. In an implementation, the recordation occurs along with the coherence tracking information 440, such as in a coherence directory included in the cache hierarchy, for example. The cache line can be updated numerous times in its lifetime in the cache 410. The cache line can also be transferred to another cache (not shown in FIG. 4, but shown in FIG. 3), such as a level one cache, for example, for which the cache 410 is inclusive. The cache controller 420 checks, at cache eviction, or probe, the indication 430 which has been recorded to indicate the line came in as all-zeroes. The cache controller 420 examines the current data to see if it is all-zeroes, and if those conditions match, the line modification is not reported and the modified state reporting is thus avoided.

Additional known patterns can also be used in line with the discussion above with respect to the all zero example. Further, an index into a structure of runtime-detected patterns can be utilized.

Figure 5:
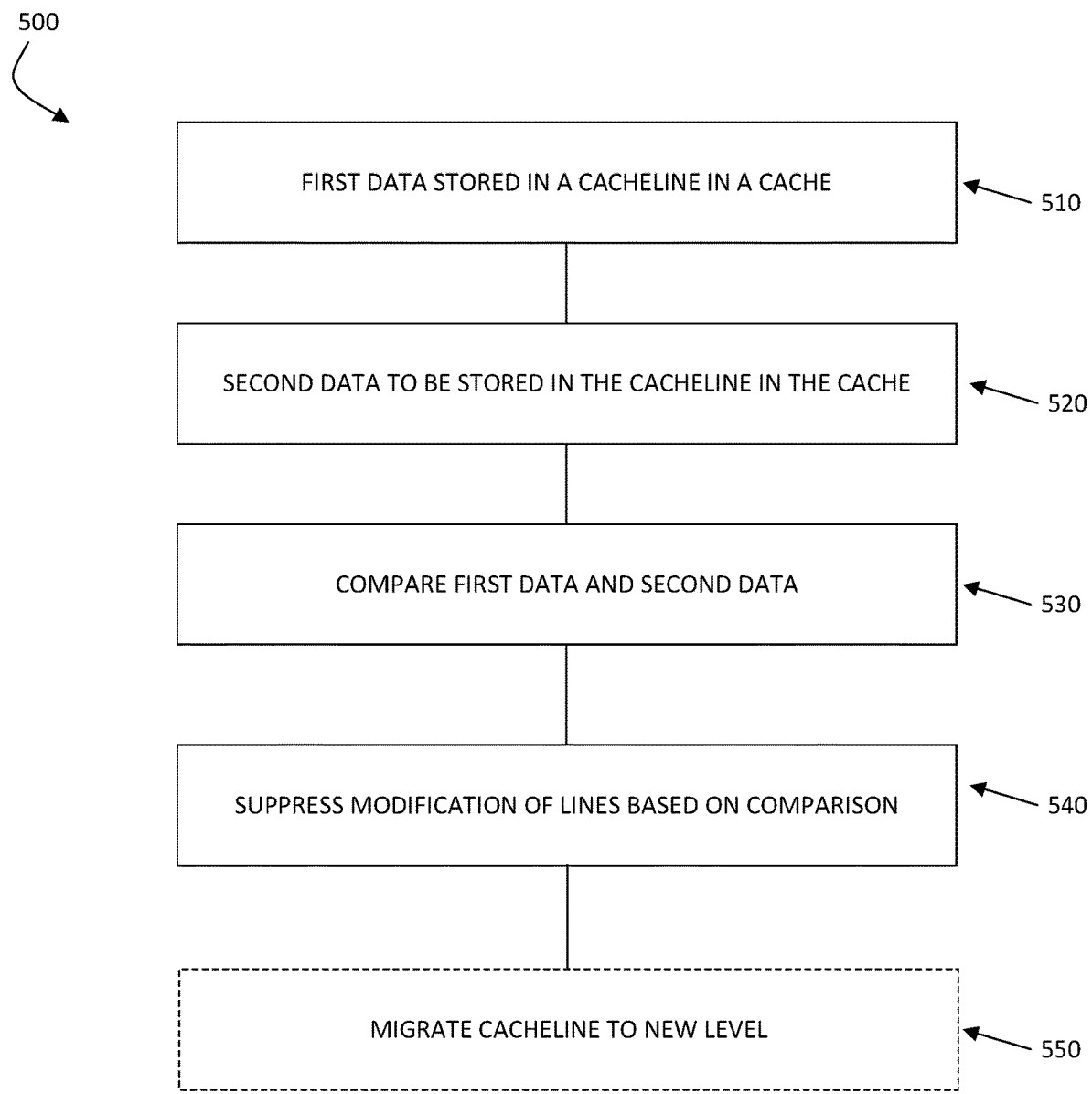
FIG. 5 illustrates a flow diagram of a method for suppressing modification of lines if insertion data into cache matches eviction data, according to an example.

FIG. 5 illustrates a flow diagram of a method 500 for suppressing modification of lines if insertion data into cache 410 matches eviction data, according to an example. Although described with respect to the systems of FIGS. 1-4, those of skill in the art will understand that any system, configured to perform the steps of the method 500 in any technically feasible order, falls within the scope of the present disclosure.

At step 510, a processing element issues a store request to store data and stores a first data in a cache, such as cache 420. According to an implementation, the first data is stored in a cache line within the cache. When the cache line enters a cache, such as a level 2 cache, for example, the cache tags record a new indication that the line came in with the data value of all zeroes. In an implementation, the recordation occurs along with the coherence tracking information 440 in the cache hierarchy, for example. The cache line can be updated numerous times in its lifetime in the cache 410. The cache line can also be transferred to another cache (not shown in FIG. 4, but shown in FIG. 3), such as a level one cache, for example, for which the cache 410 is inclusive.

At step 520, a processing element issues a store request to store a second data in the cache, such as cache 420. According to the implementation, the second data is requested to be stored in the cache line within the cache. This store request to store a second data in the cache can be identified based on the cache tag recorded upon entry of the first data in the cache as a potential for not reporting the line modification and avoiding the modified state reporting.

At step 530, the first data and second data are compared. According to the implementation, the first data is the initial data in the cache line and the second data is the final data in the cache line. The initial data and the final data are compared. The cache controller checks, at cache eviction, or probe, the recorded cache tag (or other indication) which has been recorded to indicate the line came in as all-zeroes. The cache controller examines the current data to see if it is all-zeroes.

At step 540, based on the comparison, the modification of the lines is suppressed. In the implementation, the modification of the cache line is suppressed. If the conditions in the comparison at step 530 match, the line modification is not reported and the modified state reporting is thus avoided. A benefit is achieved when stores write zeroes on top of a cache line which is already zero. Additional beneficial scenarios include writing nonzero data, but then the last write to the line is zero.

Method 500 can also include migrating the cache line to a new level at step 550. The cache line may also be transferred to another cache (not shown in FIG. 4, but shown in FIG. 3), such as a level one cache, for example, for which the cache 410 is inclusive.

According to an implementation, the store request of step 520 is configured to evict the first data from the cache line. The eviction can be based on a capacity eviction, a coherency probe, explicit flush instructions and a microarchitectural event, such as power management clearing of the cache, for example.

It should be understood that many variations are possible based on the disclosure herein. Although features and elements are described above in particular combinations, each feature or element can be used alone without the other features and elements or in various combinations with or without other features and elements.

The various elements illustrated in the figures are implementable as hardware (e.g., circuitry), software executing on a processor, or a combination of hardware and software. In various examples, each block, the processor chips 310, the system elements 308, system level memories 304, system memory controller 306, and the illustrated units of the instruction execution pipeline 200 and the computer system 100, are implementable as hardware, software, or a combination thereof. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the implementations.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
    a processor; and
    a memory operating cooperatively with a cache controller, wherein the memory comprises a coherence directory stored within a cache created to track at least one cache line in the cache via the cache controller; and
    the processor suppressing modification of a cache coherence tracking state of the at least one cache line when storing data in the cache line based on the data being of a specific value.

2. The system of claim 1 wherein the specific value is all zeroes.

3. The system of claim 1 wherein the specific value includes nonzero data based on a previous write to the at least one cache line being zero.

4. The system of claim 1 wherein the specific value is an identified pattern.

5. The system of claim 1 wherein the specific value is indexed into a structure of runtime detected patterns.

6. The system of claim 1 wherein storing the data in the cache line in the cache is based on a capacity eviction.

7. The system of claim 1 wherein storing the data in the cache line in the cache is based on a coherency probe.

8. The system of claim 1 wherein storing the data in the cache line in the cache is based on explicit flush instructions.

9. The system of claim 1 wherein storing the data in the cache line in the cache is based on a microarchitectural event.

10. A method for use in a cache, the method comprising:
    suppressing modification of a cache coherence tracking state of the cache line when storing data in the cache line based on the data being of a specific value.

11. The method of claim 10 wherein the specific value is all zeroes.

12. The method of claim 10 wherein the specific value includes nonzero data if a previous write to the cache line is zero.

13. The method of claim 10 wherein the specific value is a known pattern.

14. The method of claim 10 wherein the specific value is indexed into a structure of runtime detected patterns.

15. The method of claim 10 wherein storing the data in the cache line in the cache is based on a capacity eviction.

16. The method of claim 10 wherein storing the data in the cache line in the cache is based on a coherency probe.

17. The method of claim 10 wherein storing the data in the cache line in the cache is based on explicit flush instructions.

18. The method of claim 10 wherein storing the data in the cache line in the cache is based on a microarchitectural event.

19. The method of claim 18 wherein the microarchitectural event comprises power management clearing of the cache.

20. The method of claim 10 further comprising migrating the cache line to a new cache level.

* * * * *